Feb. 10, 1942.  H. R. CRAGO  2,272,769
CONTROL MODULATING SYSTEM
Filed March 30, 1940
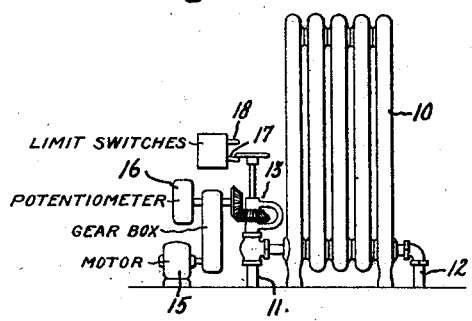
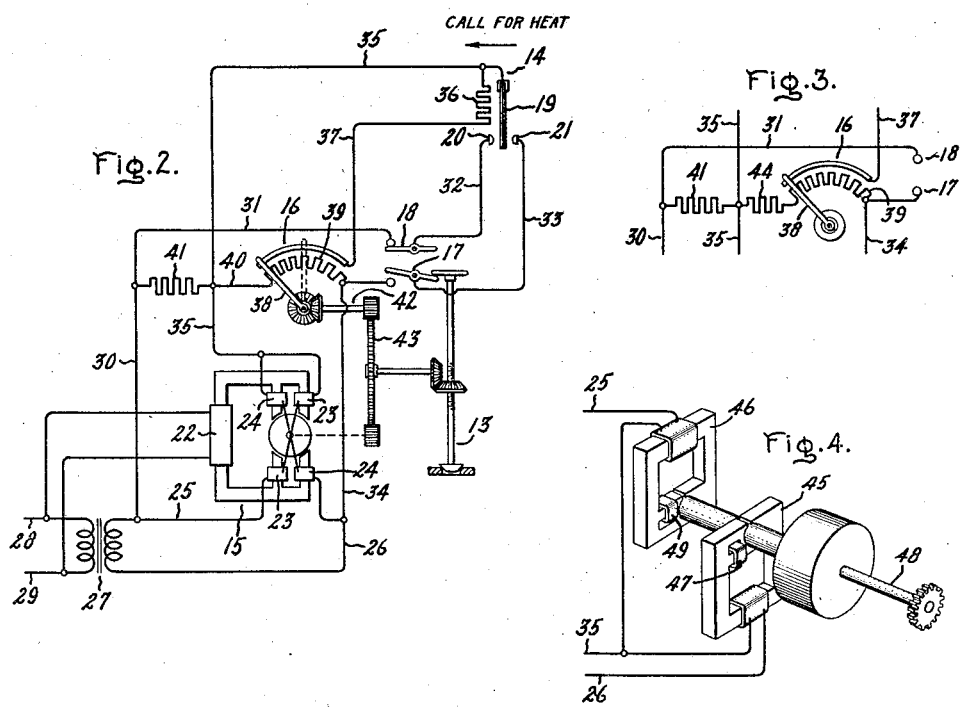
Inventor:
Harry R. Crago,
by Harry E. Dunham
His Attorney.

Patented Feb. 10, 1942

2,272,769

UNITED STATES PATENT OFFICE 2,272,769

CONTROL MODULATING SYSTEM

Harry R. Crago, Schenectady, N. Y., assignor to General Electric Company, a corporation of New York Application March 30, 1940, Serial No. 327,021

20 Claims. (Cl. 236—68)

My invention relates to an improved control arrangement and more particularly to a temperature control modulating system.

Heretofore a temperature control system has been used which includes a thermostat and a preheat coil for heating the thermostat during the time it calls for more heat. The purpose of such an arrangement is to counteract the inherent over-running of the system and to thereby anticipate the rise and fall in room temperature. It has also been proposed to vary the amount of heat emanating from the preheat coil in such a system in synchronism with the movement of a valve or damper which controls the amount of temperature changing medium which is allowed to pass to the space whose temperature is being controlled.

An object of my invention is to provide a temperature control system which is designed to control the temperature of a space at any specified value with a minimum of variations.

I accomplish this and other objects by employing a temperature control modulating system with an arrangement which provides a forcing action of the preheat coil at the moment the thermostat is actuated. I obtain this by providing an arrangement for changing the heating effect of the thermostatic preheat coil at the moment the thermostat is actuated.

Further objects and advantages of my invention will become apparent from the following description referring to the accompanying drawing, and the features of novelty which characterize my invention will be pointed out with particularity in the claims annexed to and forming a part of this specification.

In the drawing Fig. 1 illustrates an arrangement for heating a space which is provided with an embodiment of my invention; Fig. 2 diagrammatically illustrates the heat control system of the arrangement illustrated in Fig. 1; Fig. 3 diagrammatically illustrates a portion of the control circuit illustrated in Fig. 2 provided with a modification of my invention; and Fig. 4 diagrammatically illustrates a portion of the control system illustrated in Fig. 2 provided with a further modification of my invention.

My improved control modulating system is illustrated and described in its application to a heating system, but, of course, it is to be understood that my system may have application to any other system, such as a cooling system or an air conditioning system. Thus my improved system may be employed to control any temperature changing medium. Referring to the drawing, in Fig. 1 I have illustrated a system for controlling the temperature of a room or space having a heat exchanger, such as a radiator 10 connected to any suitable source of temperature changing medium, such as a heating medium, through pipes 11 and 12. The intake pipe 11 of the radiator is provided with a valve 13 which is controlled by my improved control modulating system. This system includes any suitable condition responsive device, such as a conventional thermostat 14 which is situated in the space to be heated so as to be affected by ambient temperature or the condition responsive device may be situated in any other suitable place, a motor 15, a potentiometer 16, and limit switches 17 and 18 the functions of which will be more completely hereinafter described.

In order to provide a control system which will keep a space at a constant temperature with a minimum of over- or under-running, I provide an improved control modulating system, the electric circuit of which being diagrammatically illustrated in Fig. 2. My improved system includes any suitable regulating arrangement, such as the valve 13, for varying the rate at which the heating medium is conducted to the radiator. The movement of the valve is controlled by a device responsive to changes in temperature in the space to be heated, such as the thermostat 14. This thermostat may be of any suitable type, and in the illustrated embodiment of my invention it includes a bimetallic element 19 which is adapted to co-operate with two stationary contacts 20 and 21. The actuation of the thermostat 14 due to changes in ambient temperature controls the valve through any suitable device which may be made responsive to a thermostat, such as an electric device 15. In the illustrated embodiment of my invention this electric device is a reversible alternating current motor with a winding 22 and a pair of bucking shaded pole coils 23 and 24. The shading coils 23 and 24 are connected in series across a source of potential through wires 25 and 26. These wires are in turn connected to any suitable source of power, such as a transformer 27 which is suitably excited through its leads 28 and 29. The shading coils 23 and 24 are so arranged that one-half of each is on a core member and the other-half of each on a diametrically opposite core member. The windings 23 and 24 are so arranged, however, that with both of them receiving the same current the electric motor will remain in a stationary position. In order to have the motor rotate, however, it is only necessary to short-circuit one of the coils, thus allowing the other coil to provide the necessary magnetomotive force to rotate the motor. As has already been stated, the coils 23 and 24 are connected together, their opposite ends being connected to the transformer. The transformer sides of the coils are also connected through the limit switches 17 and 18 to the thermostat 14. As illustrated in Fig. 2, the transformer side of the coil member 23 is connected to the thermostat 14 through conductors 30 and 31, limit switch 18, conductor 32 to the stationary contact 20 of the thermostat 14. The transformer side of the coil 24 is connected to the other stationary contact 21 of the thermostat 14 through conductor 33, limit switch 17, and conductors 34 and 26. In order to complete the circuit of the thermostat, the bimetallic element 19 is connected to the point between the shading coils 23, 24 by a conductor 35. It will be seen, therefore, that when the bimetallic element 19 contacts the stationary contact 20 that the coil member 23 will be short-circuited through the conductors 25, 30, 31, limit switch 18, contact 20, bimetallic element 19, and conductor 35; while, when the bimetallic element 19 contacts the stationary contact 21 the coil member 24 will be short-circuited through the conductors 26, 34, limit switch 17, conductor 33, contact 21, bimetallic element 19, and conductor 35. Assuming, therefore, that coil 23 operates to close the valve, while coil 24 operates to open the valve, it may be seen that when the bimetallic element of the thermostat 14 moves to the left and contacts the contact 20 it will be calling for heat since the coil 23 which effects closing of the valve 13 will be short-circuited; but when the bimetallic element 19 contacts the contact 21, it will be calling for less heat since the coil member 24 will be short-circuited, thus allowing the coil 23 to effect closing of the valve 13.

In order to provide an arrangement for preheating the thermostat 14 so as to anticipate changes in temperature in the room and to prevent over-running or under-running thereof, I provide a preheat resistor 36 which is positioned in close proximity to the bimetallic element 19 and is electrically connected at one end to the point between the opening and closing coils through conductor 35. The opposite end of the preheat coil 36 is connected through a conductor 37 to a movable arm 38 of the potentiometer 16, whose function will hereinafter be described. The potentiometer 16 also has a resistor 39 which is electrically connected at one end to the point between the valve closing and opening coils by a conductor 40 and the conductor 35. The other end of the potentiometer resistor is electrically connected to the transformer side of the opening coil 24 by the conductors 34 and 26. A balancing resistor 41, equal in value to the resistance of the potentiometer resistor 39, is electrically connected across the closing coil 23 so that the potentiometer does not appreciably affect the division of voltage between the opening and closing coils. Thus the resistor 41 is connected at one end to the conductor 30 and at the other end to the conductors 35 and 40.

In order to provide a modulating or control arrangement for varying the excitation on the preheat coil 36 and thereby vary its heating effect, the potentiometer 16 is employed. The movable arm of the potentiometer is actuated in synchronism with the valve 13 in any suitable manner, such as by a shaft and gears indicated by the numeral 42. This arrangement is in turn moved by the motor 15 through the gear 43 which is the gear which actuates the movable mechanism of the valve 13. Thus the movement of the potentiometer is in direct proportion to the movement of the valve 13. Furthermore, the potentiometer and valve are so arranged that when the valve is completely closed the preheat coil 36 is short-circuited, as is shown in Fig. 2, while when the valve is completely opened full voltage which normally appears across the potentiometer when the thermostat is floating is impressed across the preheat coil 36. In the range between these two extremes the excitation on the preheat coil 36 varies in direct proportion to the movement of the valve 13. Thus, at any point which the potentiometer has assumed after the thermostat has moved to its de-energized or open position, a predetermined amount of steady state excitation on the preheat coil will obtain. This will cause the preheat coil to give up a predetermined amount of heat to the mass which makes up the thermostat.

However, I have found that a modulating system, as described above, when employed in the control system of a temperature controlling arrangement under ordinary conditions does not sufficiently prevent hunting of the thermostat. This appears to be because, when the thermostat is actuated to call for a change of position of the valve 13, the valve will position itself beyond that point necessary to satisfy the thermostat's call due to the thermal lag or time constant of the mass inside the thermostat. The change in excitation of the preheat coil due to movement of the potentiometer although capable of making the proper change in heating effect of the preheat coil for steady state conditions, is not sufficient, I have found, to correct for the thermal time lag of the thermostat mass during transitory conditions. Thus hunting will follow. Therefore, in order to provide for a much more sensitive arrangement so as to obtain a minimum of over- and under-running of the temperature, I provide the modulating system with an arrangement which will abruptly change the excitation on the preheat coil and thereby its heating effect at the moment the thermostat is actuated. Thus the moment the thermostat calls for more heat an abrupt increase in excitation is placed on the preheat coil, while, when the thermostat calls for less heat a decrease in the excitation is provided. In the circuit illustrated in Fig. 2, when the thermostat calls for less heat all excitation is removed from the preheat coil. This result may be accomplished in any suitable manner, and in the illustrated embodiment of my invention, this is accomplished by the control circuit which has already been described. Thus, when the thermostat calls for more heat the closing coil 23 will be short-circuited and twice the voltage will, therefore, appear across the potentiometer than which was across it when the thermostat was floating. Thus double the voltage will appear across the preheat coil causing it to develop four times the watts. However, since the potentiometer is connected across the opening coil, when it is short-circuited the potentiometer is also short-circuited, with the result that all excitation is removed from the preheat coil. In this manner I provide a modulating system with a preheat coil the excitation of which is abruptly changed at the moment the thermostat is actuated or, in other words, an arrangement is provided for forcing the excitation of the heating element, when the thermostat is actuated, beyond that which would obtain during movement of the potentiometer with normal voltage impressed across it. Since all the mass inside the thermostat has a thermal time constant, by forcing the excitation of the preheat coil during the time the thermostat is actuated I may substantially counteract for the thermal time lag of the mass of the thermostat and thereby minimize the possibility that the valve 13 and the potentiometer will run too far before the call by the thermostat has been satisfied. This, therefore, minimizes the possibility of over- or under-running of the temperature in the space to be heated. Therefore, by forcing, I mean substantially changing the local heating effect inside the thermostat or substantially increasing the voltage impressed across the preheat coil, or substantially decreasing the voltage impressed across it, or both, and any suitable amount of forcing may be provided for, the desired amount needed depending upon the thermal characteristics of the mass which is to be heated by the local heating effect. I have described one method of accomplishing this result; however, it is to be understood that it is within the contemplation of my invention to accomplish this result by any other suitably equivalent arrangement.

The operation of my improved heat control system is as follows: Let us assume that the movable arm 38 of the potentiometer is in the position indicated by the dotted lines in Fig. 2. The movable potentiometer arm is therefore halfway between its two extreme positions. Since this arm moves in synchronism with the valve 13, the valve will also be halfway between its two extreme positions. Let us further assume that a certain voltage, such as 20 volts, appears across the transformer leads 25, 26. This means that 10 volts will be impressed across the closing coil 23 and resistor 41, and 10 volts will also be impressed across the opening coil 24 and the potentiometer resistor 39. Since the movable arm 38 of the potentiometer is at the mid-point of the resistor 39, approximately 5 volts will appear across the preheat coil 36. Let us further assume that the thermostat 14 is set for 72 degrees, and that the bimetallic element 19 is floating.

Under the above mentioned conditions, let us now assume that the thermostat calls for heat, or in other words that the ambient temperature in the room whose temperature is being controlled has dropped slightly below 72 degrees. When the thermostat calls for more heat the bimetallic element 19 will move to the left and contact the stationary contact 20. This will immediately short-circuit the closing coil of the motor and will allow the opening coil 24 to cause the motor to turn, so as to further open the valve 13. It will be seen, therefore, that the instant the closing coil 23 is short-circuited that the full 20 volts of the transformer will appear across the opening coil 24 and the potentiometer resistance 39. This will in turn cause approximately 10 volts to be impressed across the preheat coil 36, or will cause the preheat coil 36 to develop four times the watts over that which it was developing while the thermostat was floating. Thus, it will be seen that the required temperature of 72 degrees will be reached inside the casing of the thermostat 14 much more quickly than it would otherwise be reached, if we depended upon the increased heating effect of the preheat coil caused by movement of the modulating system alone. I have found that due to the sluggish nature of the transfer of heat from the preheat coil to the thermostat blade that, if the modulating system were depended upon only, that the thermostat would tend to hunt. However, with my improved system the defects of hunting are substantially eliminated.

Let us again consider the system of Fig. 2 with the thermostat floating and the movable contact arm 38 of the potentiometer in the position as shown by the dotted lines in Fig. 2. Let us now, however, assume that the thermostat calls for less heat. This will cause the bimetallic blade 19 to contact the stationary contact 21. This operation of the thermostat will cause the opening coil 24 to be short-circuited and thus allow the closing coil 23 to cause the motor to move in the direction to close the valve 13. Since the potentiometer is connected across the opening coil 24, when it is short-circuited, the potentiometer will also be short-circuited. Thus, when the thermostat calls for less heat, all effective excitation will be removed from the preheat coil 36, thus abruptly changing its excitation over that which it had immediately previously when the thermostat was floating.

Therefore, it will be seen that the temperature inside the casing of the thermostat 14 will much more quickly return to the value of 72 degrees, than if it were merely depended upon the change in voltage across the preheat coil which is affected by the movement of the movable arm 38 of the potentiometer to lower its heating effect. Furthermore, it will be noted that this increase or removal of excitation on the preheat coil will obtain so long as the thermostat remains actuated, subject, of course, to variations due to the modulation arrangement.

The operation of my improved temperature control modulating system will, of course, be similar to that described above for any other position than that assumed above, that is, with the potentiometer and the valve halfway between their extreme positions.

In order to provide an arrangement which will allow for still greater accuracy of my control system during the time when the thermostat calls for less heat, I may modify the circuit illustrated in Fig. 2 to the extent of that shown in Fig. 3. When there is a call for more heat by the thermostat any suitable forcing action of the preheat coil may be obtained by simply increasing the voltage impressed across it to a suitable amount. However, when there is a call for less heat the forcing action in Fig. 2 may only be obtained by short circuiting the preheat coil 36 or by removing all excitation therefrom. However, it may be desirable under certain conditions to be able to produce some additional forcing action when there is a call for less heat. This may be accomplished by providing a constant or residual amount of heat within the thermostat which is present when the thermostat is floating or calling for more heat but which is removed when the thermostat is calling for less heat. The thermostat may thus be calibrated to take into account or to expect this residual amount of heat and when it is removed, when there is a call for less heat, it will produce the same effect inside the thermostat as if the heating effect of the heating element is reduced to a value effectively below zero or that a source of cooling medium has been passed into the thermostat casing. It will be seen that the circuit in Fig. 3 is similar to that illustrated in Fig. 2, except that a resistor 44 is placed between the off-position end of the resistance 39 of the potentiometer and the mid-point 35 between the opening and closing shading coils. The purpose of this resistance 44 is to in effect produce a value of excitation on the preheat coil below zero, during the time the thermostat is calling for less heat. This in effect produces the same result as if a small refrigerating unit were placed inside the thermostat 14 and actuated during the time the thermostat was calling for less heat. Thus, with the resistor 44 connected in the circuit, as illustrated in Fig. 3, when the potentiometer is in its off-position, a certain voltage will appear across the preheat coil 36 which, of course, is equal to that across the resistor 44. This is different from the circuit illustrated in Fig. 2, where, when the potentiometer is in its off-position no excitation will appear across the preheat coil 36. It will be seen, therefore, that whenever the thermostat calls for less heat this excitation of the preheat coil 36 due to the resistor 44 will be removed, thus in effect reducing its excitation to a value below zero. In order to accomplish these results the thermostat 14 need only be calibrated to take into account this certain constant heating effect produced by the preheat coil due to the voltage which is across it because of the presence of the resistor 44.

Of course, with the system modified in Fig. 3, when the thermostat calls for more heat it will function similarly to that described above in connection with the description of the system of Fig. 2.

Fig. 4 illustrates a further modification of the heat control modulating system illustrated in Fig. 2, wherein opposed self-starting synchronous motors are used instead of the bucking shaded pole motor illustrated in Fig. 2. These motors may be of the construction more fully illustrated and described in United States Letters Patent No. 1,546,268 to Warren and include motors 45 and 46. These motors are exactly alike except that the shading coil 47 located in the pole faces of the motor 45 is arranged to cause a rotation of a shaft 48 in one direction, whereas the shading coil 49 in the pole faces of the motor 46 is arranged to produce a rotation of the shaft in the opposite direction.

It will be seen, therefore, that I have provided an improved control modulating system which provides for a minimum over-run or under-run of temperature over that temperature desired. This is accomplished by the forcing action of the preheat coil in the modulating system. That is, when the thermostat calls for more heat the excitation on the preheat coil will be abruptly increased, while, when the thermostat calls for less heat the excitation in the preheat coil will be abruptly lessened.

Modifications of the particular arrangements which I have disclosed embodying my invention will occur to those skilled in the art, so that I do not desire my invention to be limited to the particular arrangements set forth and I intend in the appended claims to cover all modifications which do not depart from the spirit and scope of my invention.

What I claim as new and desire to secure by Letters Patent of the United States is:

1. A system for controlling the temperature of a space including a supply of temperature changing medium, means for varying the rate at which said medium is conducted to said space, a thermostat for controlling said means, a heating element arranged to supply heat to said thermostat, modulating means for varying the excitation of said heating element in order to vary the amount of heat given off by said heating element in synchronism with the movement of said varying means, and means for forcing the excitation of said heating element when said thermostat is actuated.

2. A system for controlling the temperature of a space including a supply of temperature changing medium, means for varying the rate at which said medium is delivered to said space, a thermostat for controlling said means, a source of electric potential, an electric heating element arranged to supply heat to said thermostat, control means connected to said source and to said thermostatic heating element for varying the excitation of said thermostatic heating element proportional to the position of said varying means, and means for connecting said heating element to said source for forcing the excitation of said heating element when said thermostat calls for a change of position of said varying means.

3. A system for controlling the temperature of a space including a supply of temperature changing medium, regulating means for varying the rate at which said medium is delivered to said space, a source of electric potential, an electric device for actuating said regulating means, means including a thermostat for connecting said electric device to said source of electric potential so that said regulating means will be actuated, an electric heating element arranged to supply heat to said thermostat, means including a control modulating means for connecting said thermostatic heating element to said electric source and for varying the excitation of said heating element proportional to the position of said regulating means, and means including said heating element connecting means for substantially changing the excitation of said heating element when said thermostat calls for a change of position of said regulating means over the excitation produced by said modulating means.

4. A system for controlling the temperature of a space including a supply of temperature changing medium, means including an electric device for varying the rate at which said medium is conducted to said space, a source of electric potential, said electric device having a plurality of coils connected to said source and arranged for actuating said electric device in opposite directions, a thermostat for selectively controlling the actuation of said actuating coils, an electric heating element arranged to supply heat to said thermostat, means under the control of said rate varying means for varying the excitation of said heating element in accordance with the position of said rate varying means, and separate means under the control of said thermostat for reversely forcing the excitation on said heating element when said thermostat calls for a reversal in the actuation of said varying means in order to substantially counteract the thermal time constant of said thermostat.

5. A system for controlling the temperature of a space including a supply of temperature changing medium, regulating means for varying the rate at which said medium is conducted to said space, a source of electric potential, an electric motor having shading coils connected to said source for actuating said regulating means, a thermostat for controlling the actuation of said motor, an electric heating element arranged to supply heat to said thermostat at a varying rate, a potentiometer, means for connecting said potentiometer to said source, said potentiometer means being connected to said heating element for varying the rate at which current is supplied to said thermostatic heating element in synchronism with the movement of said regulating means, and means including said potentiometer connecting means for abruptly changing the heating effect of said heating element at the moment said thermostat is actuated.

6. A system for controlling the temperature of a space including a supply of temperature changing medium, regulating means for varying the rate at which said medium is conducted to said space, a source of electric potential, an electric motor connected to said source of potential for actuating said regulating means, said motor having a coil adapted to cause rotation in one direction and a second coil adapted to cause rotation in the opposite direction, said coils being connected in series so that said motor will remain stationary when both of said coils receive the same current, a thermostat for selectively short-circuiting each of said coils to control the actuation of said motor, an electric heating element arranged to supply heat to said thermostat, and potentiometer means including a variable resistor under the control of said regulating means for varying the excitation of said heating element in accordance with the variations in said rate and a balancing resistor interconnected with said coils, said thermostat being so connected to said potentiometer means and said coils that when it calls for a change in position of said regulating means the excitation of said heating element is abruptly changed simultaneously in a corresponding direction.

7. A system for controlling the temperature of a space including a supply of temperature changing medium, regulating means for varying the rate at which said medium is conducted to said space, a source of electric potential, an electric motor connected to said source of potential for actuating said regulating means, said motor having a coil adapted to cause rotation in one direction and a second coil adapted to cause rotation in the opposite direction, said coils being connected in series so that said motor will remain stationary when both of said coils receive the same current, a thermostat for selectively short-circuiting each of said coils to control the actuation of said motor, an electric heating element arranged to supply heat to said thermostat, and resistor means including a potentiometer under the control of said regulating means for varying the excitation of said heating element in accordance with variations in said rate, and a balancing resistor therefor connected across said coils to be energized in series when neither coil is short-circuited, and having an electrical connection with the midpoint between said coils so that the current passing through said thermostatic heating element is abruptly increased at the moment said thermostat is actuated to short-circuit one of said coils and abruptly decreased at the moment said thermostat is actuated to short-circuit the other of said coils.

8. A system for controlling the temperature of a space including a supply of temperature changing medium, regulating means for controlling the rate at which said medium is conducted to said space, a source of electric potential, an electric motor connected to said source of potential for actuating said regulating means, said motor having a coil adapted to cause rotation in one direction and a second coil adapted to cause rotation in the opposite direction, said coils being connected in series across said source so that said motor will remain stationary when both of said coils receive the same current, a thermostat for selectively short-circuiting each of said coils to control the actuation of said motor, and an electric heating element having a variable potentiometer energizing resistor therefor and a balancing resistor connected in series with said energizing resistor across said coils with a common midpoint connection between said resistors and said coils and arranged to supply heat to said thermostat, means under the control of said regulating means for operating said potentiometer to vary the energization of said heating element in accordance with variations in said rate, said thermostat having a movable contact operative in response to changes in temperature and two co-operating stationary contacts, said movable contact being electrically connected to said heating element and to said common midpoint, said one of said stationary contacts being electrically connected to one side of said source of potential, said other of said stationary contacts being connected to the other side of said source of potential so that when said thermostat is actuated one of said coils is short-circuited and the current passing through said thermostatic heating element is abruptly changed.

9. A system for controlling the temperature of a space including a supply of temperature changing medium, regulating means for controlling the rate at which said medium is conducted to said space, a source of electric potential, an electric motor connected to said source of potential for actuating said regulating means, said motor having a coil adapted to cause rotation in one direction and a second coil adapted to cause rotation in the opposite direction, said coils being connected in series across said source so that said motor will remain stationary when both of said coils receive the same current, a thermostat for controlling the actuation of said motor, a potentiometer connected to the midpoint between said motor coils and to said source of potential, a balancing resistor connected to the opposite side of said source and to said midpoint between said motor coils, an electric heating element connected to said midpoint between said motor coils and to said potentiometer and arranged to supply heat to said thermostat, means under the control of said regulating means for operating said potentiometer to vary the energization of said heating coil in accordance with variations in said rate, said thermostat having a movable contact operative in response to changes in temperature and two stationary contacts, said movable contact being electrically connected to said heating element and to said midpoint between said motor coils, one of said stationary contacts being electrically connected to one side of said source of potential, said other stationary contact being connected to said other side of said source of potential so that when said movable contact contacts each of said stationary contacts a corresponding one of said coils is short-circuited to actuate said motor in a corresponding direction and the current passing through said thermostatic heating element is abruptly changed in accordance with the direction.

10. A system for controlling the temperature of a space including a supply of temperature changing medium, reversible means for varying the rate at which said medium is conducted to said space, a thermostat for reversely controlling said means, a heating element arranged to supply heat to said thermostat, means under the control of said varying means for varying the heating effect of said element in accordance with variations in said rate, and means under the control of said thermostat for independently and reversely varying the heating effect of said heating element when said thermostat reversely controls said varying means.

11. A system for controlling the temperature of a space including a supply of temperature changing medium, reversible means for varying the rate at which said medium is conducted to said space, a thermostat for reversibly controlling said means, a heating element arranged to supply heat to said thermostat, means under the control of said reversible means for varying the heating effect of said heating element between predetermined minimum and maximum limits in accordance with variations in said rate, and separate means under the control of said thermostat for increasing the heating effect of said heating element when said thermostat calls for more heat and for reducing the heating effect of said heating element to below said minimum limit when said thermostat calls for less heat.

12. A system for controlling the temperature of a space including a supply of temperature changing medium, reversible means for varying the rate at which said medium is conducted to said space, a thermostat having a control element operable between two positions for reversely controlling said means, a source of electric potential, an electric heating element arranged to supply heat to said thermostat, potentiometer means connected to said source and to said heating element for varying the excitation of said heating element, means under the control of said reversible means for operating said potentiometer to vary the excitation of said heating element in accordance with variations in said rate, resistor means connected in circuit with said potentiometer for providing at least for a certain minimum excitation of said heating element whenever said control element is floating between said positions or calling for heat, and means controlled by said thermostat for short-circuiting said potentiometer and said resistor to reduce the energization of said electric heater to zero whenever said thermostat calls for less heat.

13. A system for controlling the temperature of a space including a supply of temperature changing medium, means for varying the rate at which said medium is delivered to said space, condition responsive means for controlling said varying means, a source of electric potential, an electric heating element arranged to supply heat to said condition responsive means, control means connected to said source and to said heating element for varying the excitation of said heating element proportional to the position of said varying means, and means for substantially increasing the voltage impressed across said control means for varying the excitation of said heating element when said condition responsive means calls for a change of position of said varying means.

14. A system for controlling the temperature of a space including a supply of temperature changing medium, means for varying the rate at which said medium is delivered to said space, condition responsive means for controlling said varying means, a source of electric potential, an electric heating element arranged to supply heat to said condition responsive means, control means connected to said source and to said heating element for varying the excitation of said heating element proportional to the position of said varying means, and means for substantially decreasing the voltage impressed across said control means for varying the excitation of said heating element when said condition responsive means calls for a change of position of said varying means.

15. A temperature control system including space temperature changing means having a control member variable in position for varying the space temperature, a reversible electric motor for actuating said member in opposite directions, means including a thermostat responsive to different values of space temperature for stopping said motor and selectively starting said motor in each direction, an auxiliary electric heater for said thermostat, electric control means for varying the excitation of said heater in accordance with the position of said member, and separate electric control means under the control of said thermostat for reversely forcing the excitation of said heater in accordance with the direction upon starting said motor.

16. A temperature control system including space temperature changing means having a control member variable in position for varying the space temperature, a reversible electric device for actuating said member in opposite directions, a source of electric potential, said electric device having opposing reversing coils connected in series across said source, a thermostat for selectively short-circuiting each of said reversing coils to effect operation of said device in the direction determined by the other coil, an electric heating element arranged to supply heat to said thermostat, potentiometer means under the control of said control member for varying the excitation of said heating element in accordance with the variations in the position of said member and connected across one of said reversing coils to be short-circuited and energized simultaneously therewith, and a balancing resistor for said potentiometer connected across the other of said reversing coils to be short-circuited and energized simultaneously therewith.

17. A system for controlling the temperature of a space including means for supplying a temperature changing medium thereto, means including a reversible electric device for varying the rate at which said medium is supplied to said space, means including a thermostat for selectively effecting operation of said electric device in each direction, an electric heating element arranged to supply heat to said thermostat, and potentiometer means under the control of said rate varying means for varying the excitation of said heating element in accordance with the variations in said rate, and means under the control of said thermostat for short-circuiting said potentiometer means to abruptly decrease the excitation of said heating element when said thermostat operates to effect a decrease in the rate at which said medium is conducted to said space.

18. A system for controlling the temperature of a space including means for supplying a temperature changing medium to said space, regulating means for controlling the rate at which said medium is supplied to said space, a reversible motor for reversely actuating said regulating means, a thermostat for stopping and selectively starting operation of said motor in each direction, an electric heating element arranged to supply heat to said thermostat, a potentiometer under the control of said regulating means for varying the heating effect of said element, and electrical means under the control of said thermostat for oppositely varying the potential impressed across said potentiometer in accordance with the direction when said thermostat operates to start said motor.

19. A system for controlling the temperature of a space including means for supplying a temperature changing medium to said space, reversible means for varying the rate at which said medium is supplied to said space, a thermostat having a controlling element operable between two positions for reversely controlling said means, an electric heating element arranged to supply heat to said thermostat, means controlled by said varying means for providing variable excitation of said heating element in accordance with the position of said reversible means whenever said control element is floating between said positions, and separate means controlled by said thermostat for substantially reducing said variable excitation whenever said control element is in one of said positions and for substantially increasing said variable excitation whenever said control element is in the other of said positions.

20. A system for controlling the temperature of a space including means for supplying a temperature changing medium to said space, means including a reversible member for varying the rate at which said medium is supplied to said space, means including a thermostat having a control element operable each way between two positions for reversely actuating said member, and electrical means jointly controlled by said reversible member and said thermostat for producing a local heating effect inside said thermostat variable within a predetermined range in accordance with variations in the position of said member when said control element is floating between said positions and within a materially higher range when said control element is in one of said positions and is reduced to zero when said control element is in said other position.

HARRY R. CRAGO.